United States Patent
Stacey et al.

(10) Patent No.: US 7,221,703 B2
(45) Date of Patent: May 22, 2007

(54) SYSTEM AND METHOD FOR SYNCHRONIZING SAMPLE RATES OF VOICEBAND CHANNELS AND A DSL INTERFACE CHANNEL

(75) Inventors: Fred Stacey, Carleton Place (CA); Dan Rivaud, Kanata (CA); Scott McClennon, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 985 days.

(21) Appl. No.: 09/818,252

(22) Filed: Mar. 26, 2001

(65) Prior Publication Data
US 2002/0003871 A1    Jan. 10, 2002

(30) Foreign Application Priority Data
Mar. 31, 2000    (CA) .................................. 2303608

(51) Int. Cl.
*H04L 5/16* (2006.01)
(52) U.S. Cl. ...................... 375/222; 375/224; 370/503; 370/505; 370/282
(58) Field of Classification Search ................ 375/222, 375/220, 224; 379/1.03, 360; 348/14.12; 370/524, 503, 505, 282
See application file for complete search history.

(56) References Cited

U.S. PATENT DOCUMENTS

| | | | |
|---|---|---|---|
| 4,494,211 A | | 1/1985 | Schwartz |
| 5,666,366 A | * | 9/1997 | Malek et al. ............... 370/505 |
| 5,852,655 A | | 12/1998 | McHale et al. |
| 5,970,103 A | | 10/1999 | Townshend |
| 5,991,311 A | | 11/1999 | Long et al. |
| 6,233,294 B1 | | 5/2001 | Bowers et al. |
| 6,310,909 B1 | * | 10/2001 | Jones ......................... 375/220 |
| 6,643,270 B1 | * | 11/2003 | Demjanenko et al. ...... 370/282 |
| 6,690,768 B2 | * | 2/2004 | Hansen ...................... 379/1.03 |
| 6,697,097 B1 | * | 2/2004 | Parker et al. ............ 348/14.12 |
| 2001/0033583 A1 | * | 10/2001 | Rabenko et al. ............ 370/503 |

* cited by examiner

*Primary Examiner*—Chieh M. Fan
*Assistant Examiner*—Eva Zheng
(74) *Attorney, Agent, or Firm*—Merek, Blackmon & Voorhees, LLC

(57) ABSTRACT

A system is provided for synchronizing a PSTN clock and a DSL clock. The system comprises a PSTN interface for transmitting and receiving voiceband samples, a data DSL transceiver for modulating and demodulating data to and from DSL samples, a synchronization circuit for synchronizing the voiceband samples and the data samples, and a converter for converting the synchronized voiceband and DSL samples between analog and digital formats. The synchronization circuit synchronizes the voiceband and the data samples for conversion by the same converter.

6 Claims, 4 Drawing Sheets

SYSTEM AND METHOD FOR SYNCHRONIZING SAMPLE RATES OF VOICEBAND CHANNELS AND A DSL INTERFACE CHANNEL

The present invention relates generally to the field of Digital Subscriber Line (DSL) technology and particularly to the sampling of voiceband Pulse Code Modulated (PCM) signals.

BACKGROUND OF THE INVENTION

With the increasing popularity of the Internet, there has been a corresponding increase in the demand for high rate digital transmission over the local subscriber loops of telephone companies. A loop is a twisted-pair copper telephone line coupling a user or subscriber telephone to a central office (CO).

Traditionally, data communication equipment uses the voice band of the subscriber loop. Such equipment includes voice band modems, which operate at up to 56 kbps using compression techniques. On the other hand, Integrated Services Digital Network (ISDN) systems have boosted data rates over existing copper phone lines to 128 kbps. However, traditional voice band equipment is limited by the maximum data rate of the existing switching networks and PCM (Pulse Code Modulation) data highways.

Utilization of the frequency bandwidth of the loop outside the voiceband has enabled other high-speed systems to evolve. However, because loops can differ in distance, diameter, age and transmission characteristics depending on the network, they pose some limitations and challenges for designers of these high-speed systems.

Current high-speed digital transmission systems of the above type include asymmetric, symmetric, high-rate, and very high-rate digital subscriber loops, conventionally known as ADSL, SDSL, HDSL and VDSL, respectively. Normally these and other similar protocols are known as xDSL protocols.

Of these flavors of xDSL, ADSL is intended to co-exist with traditional voice services by using different frequency spectra on the loop. In the future, it is possible that multiple different transmission schemes may be employed in different frequency bands on the same loop, and that these transmission schemes may include traditional analog voice services as well as current and new forms of xDSL. In today's ADSL systems, the plain old telephone services (POTS) use the frequency spectrum between 0 and 4 kHz and the ADSL uses the frequency spectrum between 30 kHz and 1.1 MHz for data over the telephone line.

FIG. 1 illustrates an independent voice circuit and ADSL line interface represented generally by the numeral 10. As is shown in the diagram, the data and voice transmissions use different Digital-to-Analog Converters (DACs) 12. Similarly, the data and voice receptions use different Analog-to-Digital Converters (ADCs) 14.

There is a trend in electronics to manufacture more integrated components. The reasons for this trend include both reducing the cost and reducing complexity of the component. Therefore, it would be beneficial to integrate the circuit as shown in FIG. 1 such that it uses only one DAC 12 and one ADC 14. While this concept may seem trivial, it is complicated by the fact that the timing for each DAC 12 is derived from a separate clock. The situation is the same for each ADC 14. Therefore, the timing of an integrated DAC or ADC will require significant changes to the current technology.

In addition, any of the xDSL systems may be used to transport digitized voice as part of its payload. When a clock domain of the digitized voice and a clock domain of the xDSL bit streams are not synchronous, it can lead to inefficiencies in the framing rate of the voice channels in the xDSL data streams. The asynchronous nature of the clocks can also lead to difficulties with voice sampling clock generation at the customer premises end of the xDSL loop.

It is an object of the present invention to obviate or mitigate some of the above disadvantages.

SUMMARY OF THE INVENTION

In accordance with the present invention, there is provided a system for synchronizing a (PSTN) clock and a DSL clock. The system comprises a PSTN interface for transmitting and receiving voiceband samples, a data DSL transceiver for modulating and demodulating data to and from DSL samples, a synchronization circuit for synchronizing the voiceband samples and the data samples, and a converter for converting the synchronized voiceband and DSL samples between analog and digital formats. The synchronization circuit synchronizes the voiceband and the data samples for conversion by the same converter.

In accordance with a further aspect of the invention, there is provided a method for synchronizing a PSTN clock and a DSL clock. The method comprises the steps of upsampling a voiceband signal for increasing the frequency of the voiceband signal to a frequency comparable with a data signal, and sample slipping one of the signals for synchronizing the voiceband signal and the data signal.

In accordance with yet a further aspect of the invention there is provided a method for synchronizing a PSTN clock and a DSL clock. The method comprises the steps of determining the phase offset between a voiceband signal and a data signal and shifting one of the voiceband or data signals for synchronizing the voiceband signal the said data signal.

BRIEF DESCRIPTION OF THE DRAWINGS

An embodiment of the invention will now be described by way of example only, with reference to the accompanying drawings in which.

DETAILED DESCRIPTION OF THE PREFERRED EMBODIMENT

A feature of the present invention is the integration of a voice circuit interface and an ADSL interface such that one DAC and one ADC are used. In order to integrate the system as desired, the voiceband pulse-code modulated (PCM) signals are re-sampled by crossing between two different time domains with nearly (but not necessarily exactly) synchronous clocks. Specifically, voiceband signal re-sampling is proposed for synchronizing voiceband samples originating from or destined for the PSTN (Switch Telephone Network) with the carrier and/or symbol rate of a xDSL xTU-C transceiver. The xTU-C transceiver is the head end transceiver at the central office or some other remote location. The synchronization permits operation even where the transceiver cannot be locked to the PSTN clock.

Constraints are placed on the maximum deviation of an xDSL xTU-C transmitter carrier and/or symbol rates from nominal. With ADSL (Asymmetric DSL), for example, the tolerance of the local timing reference of the transceivers is required to be within approximately 50 ppm of the nominal rate. xTU-C transceivers can operate off their own local timing reference (usually a free-running oscillator) rather than a clock slaved off the PSTN system timing. This provides the transceiver with an accurate and low jitter clock source even where a sufficiently accurate PSTN clock is unavailable (e.g., the tolerance on T1 clocks can be as much as 130 ppm). This also avoids the need for a PLL (Phase Locke Loop) to synchronize the xDSL transceiver clocks to the PSTN clock. Such a PLL would have significant demands on it to permit frequency tracking while maintaining low jitter on the xDSL transceiver sampling clocks. Low jitter is necessary to support the high data rates in the xDSL system.

Figure 1:
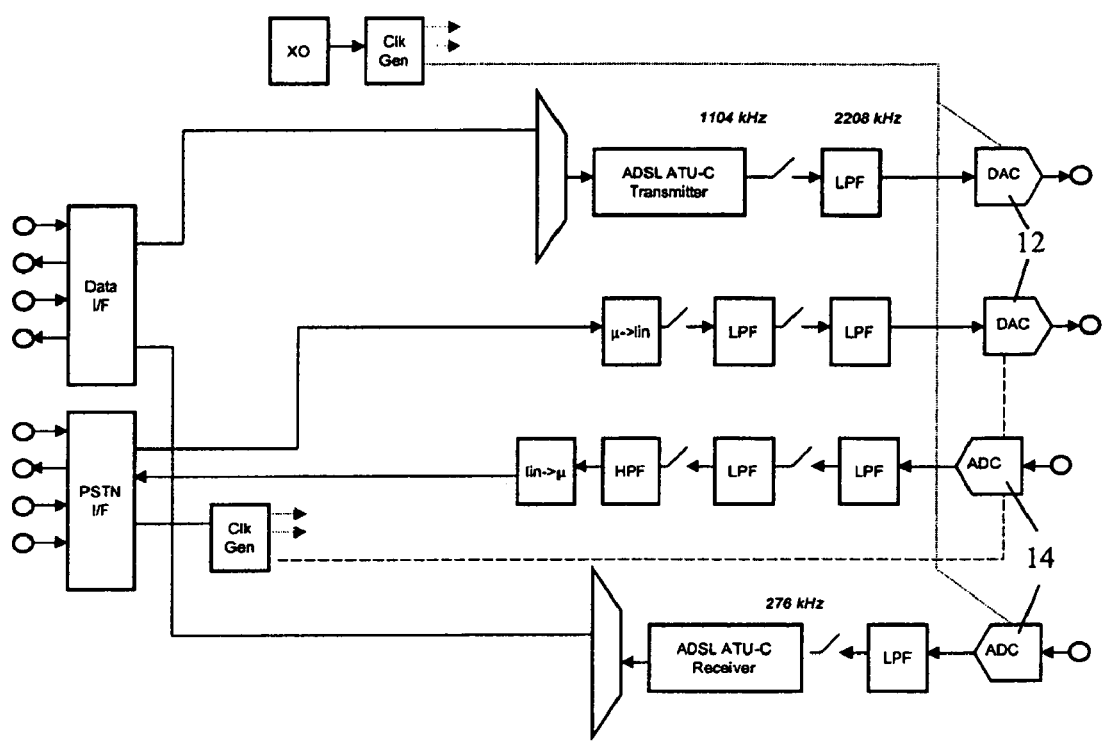
FIG. 1 is a schematic diagram of an independent voice circuit and ADSL line interface.
Figure 2:
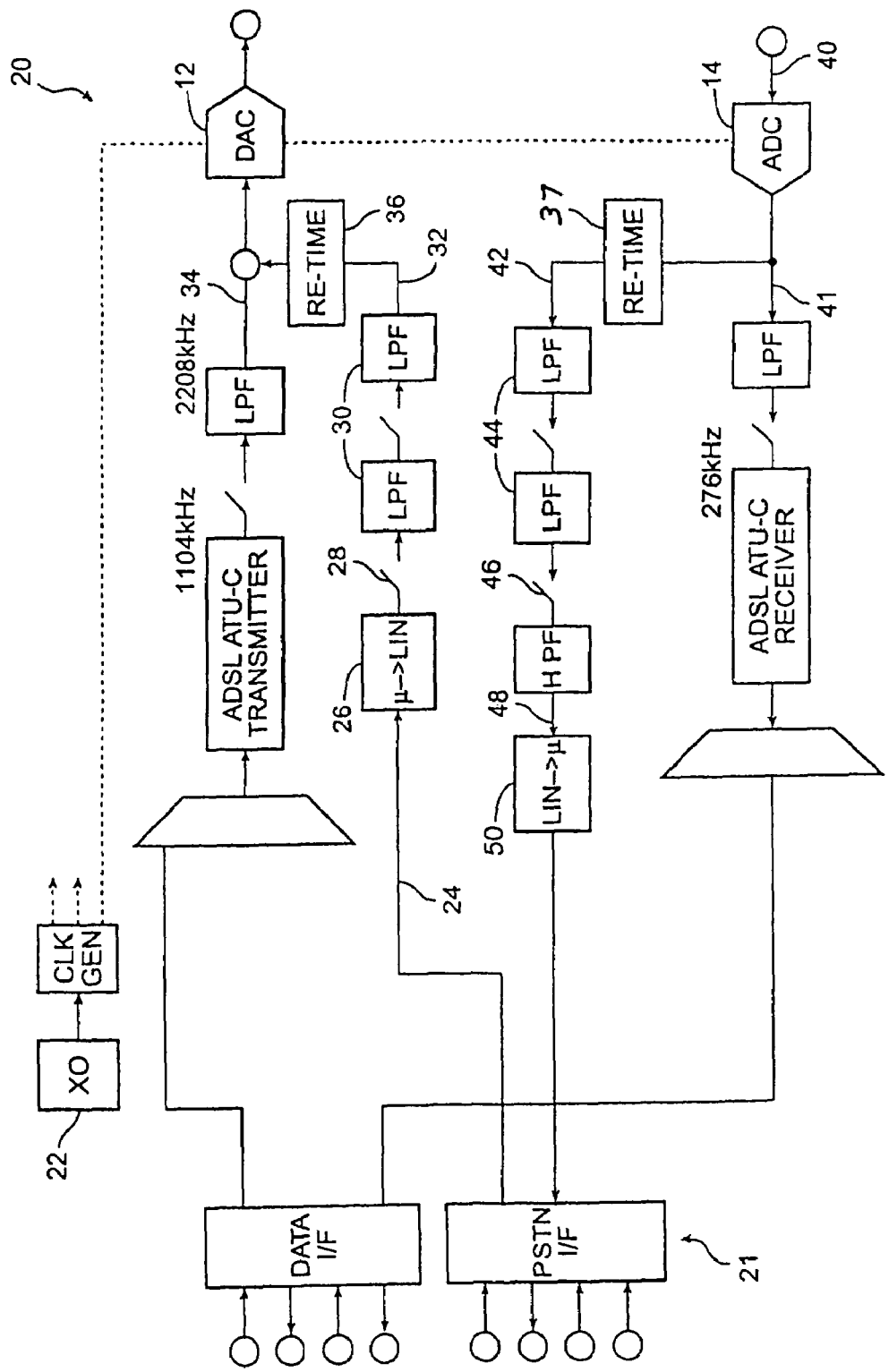
FIG. 2 is a schematic diagram of an integrated voice circuit and ADSL line interface.

Referring to FIG. 2, an embodiment of the invention is represented generally by the numeral 20. In FIG. 2, a splitterless (G.lite) ADSL line interface is integrated with a voice circuit or POTS (Plain Old Telephone System), line interface. The result is an interface 20 that shares a common ADC 14, DAC 12 and line driver (not shown). Using a common ADC 14 and/or DAC 12 requires the voice and ADSL sample rates to be synchronous.

An oscillator 22 provides an accurate clock at a nominal frequency of 8 kHz. Therefore, the actual frequency of the oscillator 22 is 8·N kHz, where N is an integer. The oscillator 22 provides the clock timing for the data transmission components (unsshaded), including the DAC 12 and the ADC 14.

A voice PCM transmission signal 24 is provided from the PSTN at a sample frequency of (8+δ) kHz, where δ is the frequency offset between the nominal value of the xDSL transceiver and PSTN clocks.

Initially, the voice signal 24 from the PSTN 21 is converted by a converter 26 from compressed PCM samples (such as μ-law or A-law) to a linear format.

The linear voice signal 28 is upsampled so that its frequency is at least a similar order of magnitude to the frequency of the oscillator 22. Therefore, upsampling increases the frequency of the voice signal 24 from (8+δ) kHz to (8+δ)·N kHz. There may be multiple upsampling stages 30, each of which increases the sample rate by interleaving zeros and low pass filtering for attenuating spectral images above the original Nyquist rate. Although the upsampling is shown in stages (for efficiency), the net result can be mapped to an equivalent single stage operation with one low-pass filter. The upsampled signal 32 has the desired frequency of (8+δ)·N kHz.

At this point, however, the upsampled voice signal 32 cannot simply be added to the modulated data signal 34 since the two are still at different sampling frequencies ((8+δ)·N kHz and 8·N kHz respectively). Therefore, a re-timer 36 is used to perform a rate conversion between the upsampled voice signal 32 and the modulated data signal 34.

The rate conversion can be implemented at the oversampled rate via sample slips as long as the oversampled rate is sufficiently high (approximately 2 MHz or greater). Sample slipping at this high rate, as opposed to the original PCM sample rate, keeps the resulting noise or distortion products below the voice circuit line interface specifications (approximately 40 dB below signal).

The re-timer 36 functions as a one-element first in first out FIFO (First In First Out) buffer that loads a register synchronous to one clock domain and reads it synchronous to another. The input to the re-timer 36 is the upsampled voice signal 32. The value of the input signal 32 is available as output for addition to the data signal 34. However, the signals 32 and 34 are combined at the timing rate of the oscillator 22, that is 8·N kHz.

If δ happens to be zero, the frequencies are matched and as the input signal 32 becomes available, it is added to the data signal. If δ is positive, the frequency of the upsampled voice signal 32 is higher than the frequency of the data signal 34. Therefore, the output of the re-timer 36 is undersampled, and some values of the voice signal 32 are discarded. If, however, δ is negative, the frequency of the upsampled voice signal 32 is lower than the frequency of the data signal 34. The output of the re-timer 36 is oversampled and some values of the voice signal 32 are repeated.

The result of the aforementioned process is a synchronized combination of the voice 32 and data 34 signals. The combined signal is converted to an analog signal by a single DAC 12.

A similar process is used in the receive direction. A single ADC 14 digitizes a frequency-multiplexed voice and data signal 40, converting the analog signal to a digital signal 41. The digital signal 41 is sent to an ADSL ATU-C Receiver where the voice component is filtered from the signal and the remaining data signal is processed. The ADC output 41 is also sent to a re-timer 37. The re-timer 37 operates in a similar fashion to that previously described. In this instance, however, the frequency is being changed from 8·N kHz to (8+δ)·N kHz instead of from (8+δ)·N kHz to 8·N kHz.

The re-timed signal 42 is downsampled and, at the same time, the data transmission is filtered from the signal 42 via the low pass filters 44. As is the case for upsampling, the downsampling stages can also be mapped to an equivalent single stage operation with one low-pass filter. The downsampled signal 46 is high pass filtered in order to remove any DC (direct current) offset and/or AC (alternating current) hum. This type of noise typically occurs at or below approximately 60 Hz. The filtered signal 48 is then converted by converter 50 from a linear format to compressed PCM samples (μ-law or A-law) and fed to the PSTN 21.

Figure 3:
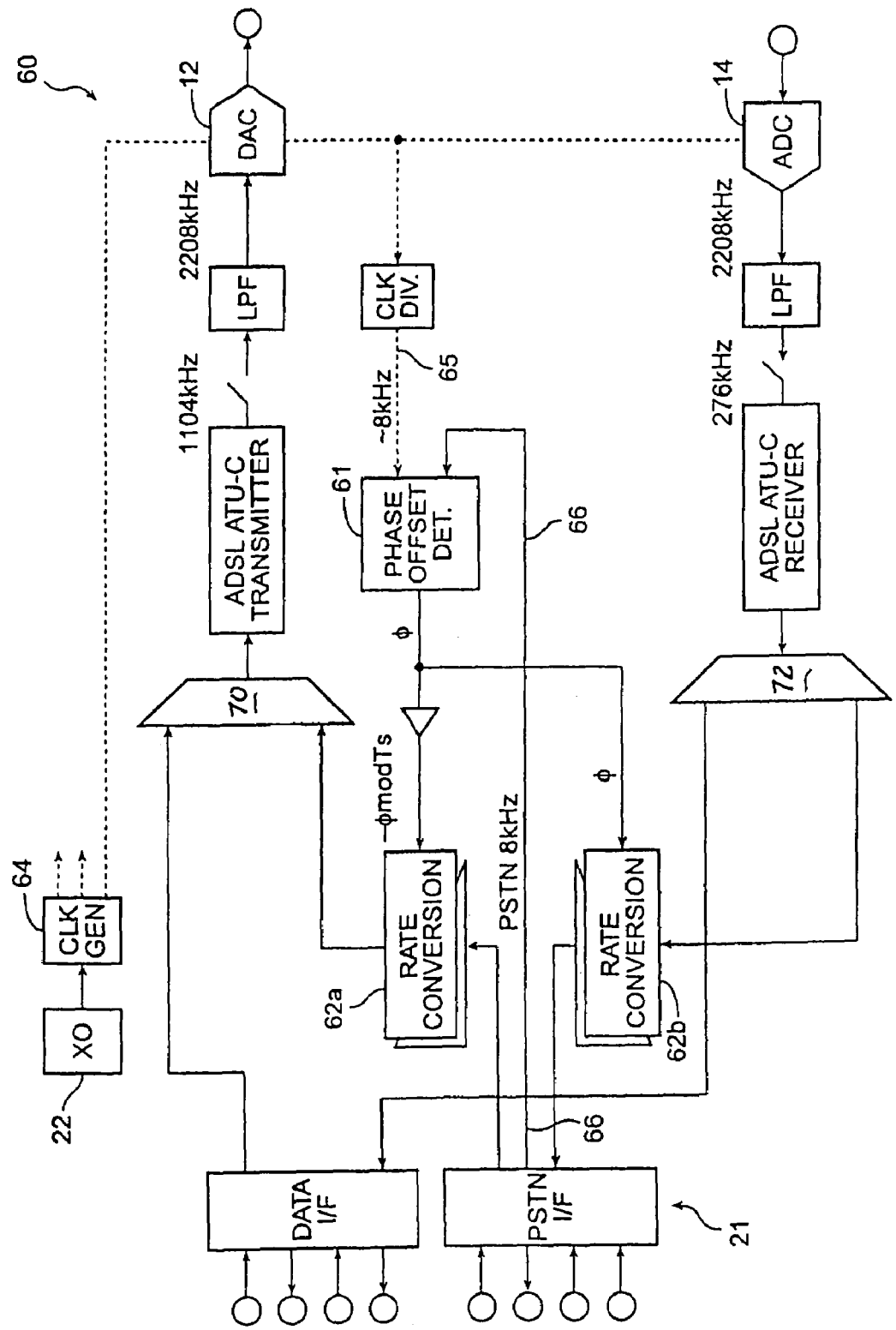
FIG. 3 is an signal flow diagram of a channelized voice over ADSL line.

FIG. 3 illustrates an alternate embodiment of the invention, represented generally by the numeral 60, wherein voice PCM channels are transported over an ADSL link in a channelized format. The channelized format may be Time Division Multiplexed (TDM) or the like. This channelized transport has advantages over an (ATM)-cell based transport as it avoids the delays associated with ATM cell assembly/disassembly. Such delays increase the perceptibility of echo and will lead to unacceptable voice quality or force use of echo cancelers at the cost of added complexity. The xDSL link frame structure required to support a channelized voice transport may be kept relatively simple if the voice sample rate is synchronous with the xDSL link rate. In addition, when the voice sample rate is synchronous with the xDSL link rate the Customer Premises Equipment (CPE) can easily re-generate the voice sampling clock directly from the recovered xDSL link clock, as opposed to requiring a separate PLL operating off a Network Timing Reference (NTR).

This embodiment of the invention comprises a phase offset detector 61 to track the phase offset, Φ ((in seconds), between a master clock 64 associated with the xDSL transceiver at nominally 8 kHz and the PSTN clock 66 at (8+δ) kHz. This phase offset will change at a rate proportional to the frequency offset, δ, between a divided down xDSL transceiver clock 65 and the PSTN 8 kHz clock 66. A rate conversion or (more precisely) a phase interpolation block 62 uses the phase offset information to re-generate samples passing through the block 62 at new phases corresponding to that of the output, sampling clock.

For this scenario, the rate conversion (phase interpolation) may be performed at the nominal 8 kHz rate. It can still, however, be interpreted as having been implemented as upsampling by a factor of M, sample slipping at that rate (M*8 kHz), and then downsampling by M. Again M should be sufficiently large to keep the noise and distortion products of the implicit sample slip at M*8 kHz below the voice circuit line interface specifications. The upsampling, filtering and downsampling are implied in the rate conversion/phase interpolation operation.

The phase offset detector 61 has as its inputs the PSTN clock 66 and a divided down xDSL transceiver clock 65, and is clocked by the xDSL transceiver master clock 64. The detector 61 determines how many cycles of the master clock 64 pass between the rising (or falling) edge of the divided down xDSL transceiver clock 65 and the rising (or falling) edge of the PSTN clock 66. The number of master clock cycles between the two clocks is proportional to the phase offset, Φ, between them.

The sign of the phase offset, Φ, is determined by which of the xDSL transceiver clock 56 or the PSTN clock 66 is determined to be the reference clock. In the description that follows, the clock on the input side of the phase interpolator block is deemed to be the reference clock. Since the input to phase interpolator block 62a is clocked by the xDSL transceiver clock 65 and the input to phase interpolator block 62b is clocked by the PSTN clock 66, the clock considered to be the reference clock for each block is reversed. Specifically, a phase offset Φ for phase interpolator 62a correlates to a phase offset −Φ for phase interpolator 62b.

Also shown in FIG. 3 is a multiplexer circuit 70 coupled to multiplex said data signal with the adjusted voice signal for transmission and a demultiplexer circuit 72 coupled to demultiplex said data signal with the adjusted voice signal for transmission.

Figure 4:
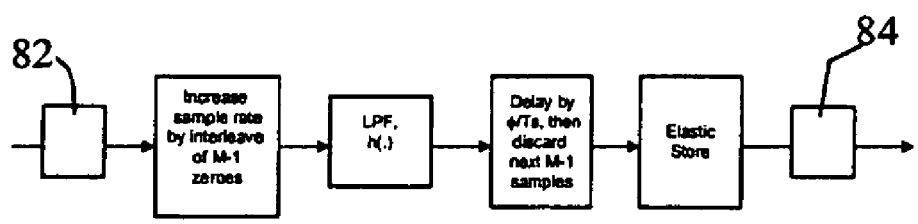
FIG. 4 is as a block diagram of a phase interpolation block.

FIG. 4 illustrates a more detailed view of the phase interpolation block 62. The sampling operations are performed on PCM samples in a linear format. Input samples, x, need to be converted 82 from companded (μ-law or A-law) to linear format before this operation and output samples, y, are converted 84 back to μ-law or A-law afterwards.

In this case, the phase offset, Φ, is computed with a resolution equal to Ts/M, where Ts is nominally 125 usec. Equivalently, Φ may be considered as an offset of j=0,1, 2, . . . , M−1 samples at an oversampled rate of M*8 kHz; i.e., Φ=j*Ts/M.

The following equation represents the general functionality of the phase interpolation block 62a:

$$y(n + j/M) = \sum_{k=-Q}^{Q} h(kM + j)x(n - k)$$

where:

y(n+Φ/M) is the output sample, interpolated between sample instants nTs and (n+1)Ts with an offset from Ts of (Φ/M)Ts, h( ) is the impulse response of a low-pass filter of length M*(2Q+1) samples at the oversampled rate (nominally, M/Ts), and x(n−k) and y(n+j/M) are sampled nominally at 8 kHz, with some small offset.

With Φ increasing (for example, where the output rate is slower than the input rate) at the point where Φ reaches Ts, an output sample, y, is discarded and Φ is reset to zero. When Φ is decreasing (for example, the output rate is faster than the input rate), and reaches zero, a second output sample, y, is then generated for the current input sample using a new Φ set to (M−1)*Ts/M.

For the phase interpolation block 62b, the functionality may be generalized as:

$$y(n + (-j \bmod M)/M) = \sum_{k=-Q}^{Q} h(kM + (-j \bmod M))x(n - k)$$

Therefore, as Φ decreases, the output rate is slower than the input rate and reaches Ts. At that point, an output sample, y, is discarded and Φ is reset to zero. When Φ is increasing, the output rate is faster than the input rate, and reaches zero. A second output sample, y, is then generated for the current input sample using a new Φ set to (M−1)*Ts/M.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are define as follows:

1. A system for synchronizing voice signal received via a public switched telephone network (PSTN) and data signal received via a digital subscriber line (DSL), the system comprising:
   a PSTN interface coupled to transmit and receive the voice signal;
   a data DSL transceiver coupled to modulate and demodulate the data signal;
   a synchronization circuit coupled to synchronize said voice signal and said data signal; and
   a converter circuit coupled to convert the synchronized voice signal and the synchronized data signal between analog and digital formats, wherein said synchronization circuit synchronizes said voice signal with said data signal, and comprises:
   a phase offset detection circuit coupled to detect a phase difference between a PSTN clock associated with said voice signal and a DSL clock associated with said data signal;
   a phase interpolation circuit coupled to adjust said voice signal according to the detected phase difference; and
   a multiplexer circuit coupled to multiplex said data signal with the adjusted voice signal for transmission.

2. A system for synchronizing voice signal received via a public switched telephone network (PSTN) and data signal received via a digital subscriber line (DSL), the system comprising:
   a PSTN interface coupled to transmit and receive the voice signal;
   a data DSL transceiver coupled to modulate and demodulate the data signal;
   a synchronization circuit coupled to synchronize said voice signal and said data signal; and a converter circuit coupled to convert the synchronized voice signal and the synchronized data signal between analog and digital formats, wherein said synchronization circuit synchronizes said voice signal with said data signal and comprises:

a phase offset detection circuit coupled to detect a phase difference between a PSTN clock associated with said voice signal and a DSL clock associated with said data signal;

a demultiplexer circuit coupled to demultiplex said voice signal and said data signal from a received signal; and a phase interpolation circuit coupled to adjust said voice signal according to the detected phase difference.

3. The system of claim 1 further comprising: circuitry adapted to combine the voice signal and the data signal.

4. The system of claim 3 further comprising: a converter circuit coupled to convert the combined voice and data signals between analog and digital formats.

5. The system of claim 2 further comprising: circuitry adapted to combine the voice signal and the data signal.

6. The system of claim 5 further comprising: a converter circuit coupled to convert the combined voice and data signals between analog and digital formats.

* * * * *